Patented Feb. 27, 1945

2,370,378

UNITED STATES PATENT OFFICE 2,370,378

PROCESS OF MAKING A WOOD PRESERVING COMPOSITION

Edward V. Swanson, San Francisco, Calif.

No Drawing. Application January 16, 1941, Serial No. 374,708

5 Claims. (Cl. 167—38.6)

This invention relates to preservatives and particularly preservatives for preserving and waterproofing wood, leather, canvas, and the like.

According to the present invention a preservative can be cheaply prepared which penetrates into the wood or material treated and which is repellent to termites and the like, and which retains its preservative and insect repelling characteristics indefinitely, and which also waterproofs the material.

The preservative composition includes a resinous solution, in the herein illustrative embodiment liquid turpentine, in which is dissolved a filler soluble in turpentine, and chlorine introduced into the solution so as to cause a chemical reaction therein for forming the preservative composition. The chlorine before its introduction into the solution is preferably treated by being passed through a corrosive substance or corrosive solution such as sodium peroxide or nitric acid or the like.

The filler, such as rosin, is placed in liquid turpentine in such quantity as to produce a solution of a desired density. The thinness or thickness of the solution depends on the degree of penetrative effect required. The chlorine is passed through a corrosive substance or corrosive solution, for instance through nitric acid or hydrogen peroxide mixed with water. The chlorine thus treated is then passed into the resinous solution.

The chlorine under its treatment seems to change its color from greenish yellow to blue. When the treated chlorine is introduced into the turpentine solution, first it causes cottonlike clouding of the white or almost colorless turpentine solution. Continued introduction of the treated chlorine into the turpentine solution developes heat and also causes the darkening of the solution toward a brownish color. The reaction is continued until the turpentine solution is very dark. At the completion of the reaction the product is jet black. It is to be noted that chlorine should be introduced into the resinous solution gradually so as to maintain a desired heat of reaction preferably below boiling point. The introduction of the entire volume of treated chlorine required for the reaction too quickly would cause over heating and over boiling. The completion of the reaction is also indicated by the liberation of chlorine from the solution.

It is to be noted that instead of chlorine, either of the other elements of the halogen group may be utilized in the herein composition and process.

The resulting product is a very dark, jet black composition which smells about like turpentine, but it penetrates into the wood or leather, or the like material without being as volatile as turpentine. Its penetration is to a depth determined by its thickness or density. The product is not soluble in water or in alcohol. It retains its effective insect repelling quality for a very long period, and so far as present tests would indicate, indefinitely. In comparison with other wood or similar preservatives, it was found that under identical conditions termites which will crawl over wood treated with various preservatives of the type heretofore used, keep away entirely and do not even touch or crawl upon wood treated by my composition herein described.

I claim:

1. Method of making a preserving composition of the character described, which consists in dissolving resin in liquid turpentine, passing chlorine through a sodium peroxide solution, and then passing the treated chlorine into said turpentine solution until the turpentine solution turns dark.

2. The process of making a wood preserving composition of the character described which comprises, dissolving rosin in liquid turpentine, treating chlorine separately from said solution by passing the chlorine through a solution of sodium peroxide, and then passing the treated chlorine into said turpentine solution at such rate as to maintain said turpentine solution at a heat below the boiling point until the turpentine turns dark.

3. The process of making a wood preserving composition of the character described which comprises, dissolving rosin in liquid turpentine, contacting chlorine with a solution of sodium peroxide, and then passing the treated chlorine into said turpentine solution until the reaction liberates chlorine, the chlorine being introduced at such rate that the resulting chemical reactions maintain said turpentine solution during said reaction hot but below the boiling point.

4. The process of making a wood preserving composition of the character described which comprises, the steps of passing chlorine through a turpentine solution containing rosin capable of being dissolved in said turpentine, and pretreating said chlorine before the chlorine is passed into said solution by contacting said chlorine with a solution containing sodium peroxide.

5. The process of making a wood preserving composition of the character described which comprises, introducing into a solution of rosin in liquid turpentine chlorine pre-contacted with another solution containing sodium peroxide.

EDWARD V. SWANSON.